United States Patent
Kirk

(10) Patent No.: US 9,301,088 B2
(45) Date of Patent: Mar. 29, 2016

(54) COMPREHENSIVE TSUNAMI ALERT SYSTEM VIA MOBILE DEVICES

(75) Inventor: Erik A. Kirk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2450 days.

(21) Appl. No.: 12/120,529

(22) Filed: May 14, 2008

(65) Prior Publication Data

US 2009/0286505 A1    Nov. 19, 2009

(51) Int. Cl.
*H04M 11/04* (2006.01)
*H04W 4/02* (2009.01)
*G01C 21/20* (2006.01)
*G08B 27/00* (2006.01)

(52) U.S. Cl.
CPC .......... *H04W 4/02* (2013.01); *G01C 21/20* (2013.01); *G08B 27/005* (2013.01); *G01S 2205/006* (2013.01); *H04M 2242/30* (2013.01)

(58) Field of Classification Search
CPC ............................. H04W 4/22; H04W 76/007
USPC ................. 455/404.2, 404.1, 90.1, 90.2, 407
See application file for complete search history.

(56) References Cited

U.S. PATENT DOCUMENTS

| | | | |
|---|---|---|---|
| 6,847,889 B2 * | 1/2005 | Park et al. | 701/209 |
| 7,259,656 B1 * | 8/2007 | Wright | 340/286.14 |
| 2006/0025106 A1 * | 2/2006 | Byers et al. | 455/404.2 |
| 2006/0241856 A1 * | 10/2006 | Cobleigh | G06T 17/05 701/533 |
| 2007/0072583 A1 | 3/2007 | Barbeau et al. | |

* cited by examiner

*Primary Examiner* — Chuck Huynh
(74) *Attorney, Agent, or Firm* — Steven M. Greenberg, Esq.; CRGO Law

(57) ABSTRACT

Embodiments of the present invention address deficiencies of the art in respect to navigation in GPS-enabled mobile computing devices and provide a novel and non-obvious method, system and computer program product for location-based tsunami alerting navigational instructions in mobile computing devices. In an embodiment of the invention, a location-based tsunami alerting data processing system can be provided. The system can include a central processing unit coupled with a memory component, and a visual display along with location-based navigation logic that is enabled to compute a geographic zone of danger resulting from a tsunami, identify a geographic location for a mobile computing device corresponding to a subscriber, and render a set of personalized navigational instructions in the mobile computing device responsive to a determination that the subscriber is located in the geographic zone of danger.

14 Claims, 2 Drawing Sheets

COMPREHENSIVE TSUNAMI ALERT SYSTEM VIA MOBILE DEVICES

BACKGROUND OF THE INVENTION

1. Field of the Invention

The present invention relates to the field of navigation in GPS-enabled mobile computing devices and more particularly to personalized location-based navigational instructions for disaster alerting systems.

2. Description of the Related Art

In the world each year, natural hazards cause hundreds of deaths and cost billions of dollars in disaster aid, disruption of commerce, and destruction of homes and critical infrastructure. Tsunamis have the highest potential for causing catastrophic casualties, property damage, and economic disruption. Rapid changes of the seafloor, mainly caused by earthquakes, can generate a tsunami which is a series of traveling ocean waves of extreme length. Tsunamis have also been caused by the eruption of coastal and island volcanoes, submarine land slides, and oceanic impacts of large meteorites.

Other agencies rely on U.S. Geological Survey (USGS) information to help them fulfill their responsibilities regarding natural hazards. For example, the National Weather Service (NWS) relies on USGS real-time information for developing forecasts and issuing flood watches and warnings. The NWS also relies on data from USGS-supported seismic networks as a primary input for tsunami warnings.

When a tsunami reaches the coast and moves inland, tsunami waves can flood or inundate low lying coastal areas. Tsunami inundation is the horizontal, inland penetration of waves from the shoreline. Inundation distances can vary greatly along the shorelines, depending on the intensity of the tsunami waves, the undersea features, and the land topographic elevations. One coastal community may see no damaging wave activity, while another nearby community can be attacked by large and violent waves. Flooding can extend inland by several hundred meters, covering large expanses of land with water and debris.

Tsunami warnings have typically been communicated to individuals through television or radio media. Recently, comprehensive tsunami alert systems have been developed that utilize sirens and even text messaging to cell phone users.

U.S. Patent Application 2007/0072583 discloses an emergency reporting system for hurricanes. The system disperses public announcements such as evacuation warnings, evacuation routes and current shelter locations as text messages to cell phone users based on their current location. The application obtains the global positioning system (GPS) coordinates directly from a mobile device and transfers this information to the server. Once the user's position is known to the server, it compares the user's position to the geographic information systems (GIS) database where evacuation zones are stored. The server then assembles and sends a text message back to the user with information about their evacuation zone and whether they are under a mandatory evacuation. Even though this may be useful for hurricanes, this reference fails to solve the problem for tsunami conditions. Unlike hurricanes which allow 24-72 hours to evacuate, tsunami evacuations must be done in 15-30 minutes after a warning has occurred. Thus, the reference's warning system that can send text messages of generic evacuation routes would not help someone in a tsunami since the text message of "seek shelter" isn't personalized enough to suffice. Additionally, telling someone to go to a shelter doesn't help them get out of a danger zone that will be flooded. The shelter could still be in the danger zone.

Thus, the problem of current methods, are that the natural disaster alerts do not provide a personalized service that is capable of directing an individual in a specific location to the nearest dry location based on their current geographic coordinates at the time of the alert. Often, these dangerous situations give rise to the need for efficient navigational instructions that point the user in the direction of safety based on a specified geographic coordinates.

BRIEF SUMMARY OF THE INVENTION

Embodiments of the present invention address deficiencies of the art in respect to navigation in GPS-enabled mobile computing devices and provide a novel and non-obvious method, system and computer program product for location-based tsunami alerting navigational instructions in mobile computing devices. In an embodiment of the invention, a location-based tsunami alerting data processing system can be provided. The system can include a central processing unit coupled with a memory component, and a visual display along with location-based navigation logic that is enabled to compute a geographic zone of danger resulting from a tsunami, identify a geographic location for a mobile computing device corresponding to a subscriber, and render a set of personalized navigational instructions in the mobile computing device responsive to a determination that the subscriber is located in the geographic zone of danger.

In another aspect of the embodiment, computing a geographic zone of danger further can include receiving an alert from a tsunami monitoring agency, computing a set of geographical coordinates corresponding to a zone of danger based on tsunami computer simulation modeling data, flagging the set of geographical coordinates corresponding to the zone of danger.

In yet another aspect of the embodiment, a further method can include computing a set of geographic coordinates corresponding to a zone of safety. In another aspect of the embodiment, identifying a geographic location for a mobile computing device corresponding to a subscriber can be established by global positioning system (GPS) coordinates or cellular triangulation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for location-based tsunami alerting navigational instructions. In accordance with an embodiment of the present invention, a system for location-based tsunami alerting in a mobile computing device is provided. A mobile device user can subscribe to a tsunami alerting service through a wireless network service provider. The subscriber's mobile device can compute a geographic zone of danger resulting from a tsunami and determine whether the subscriber's current location is within the zone of danger that may be affected by severe flooding as a result of the tsunami. The mobile device can display a set of personalized navigational instructions calculated by determining the safest shortest path to direct the subscriber out of the zone of danger.

Figure 1:
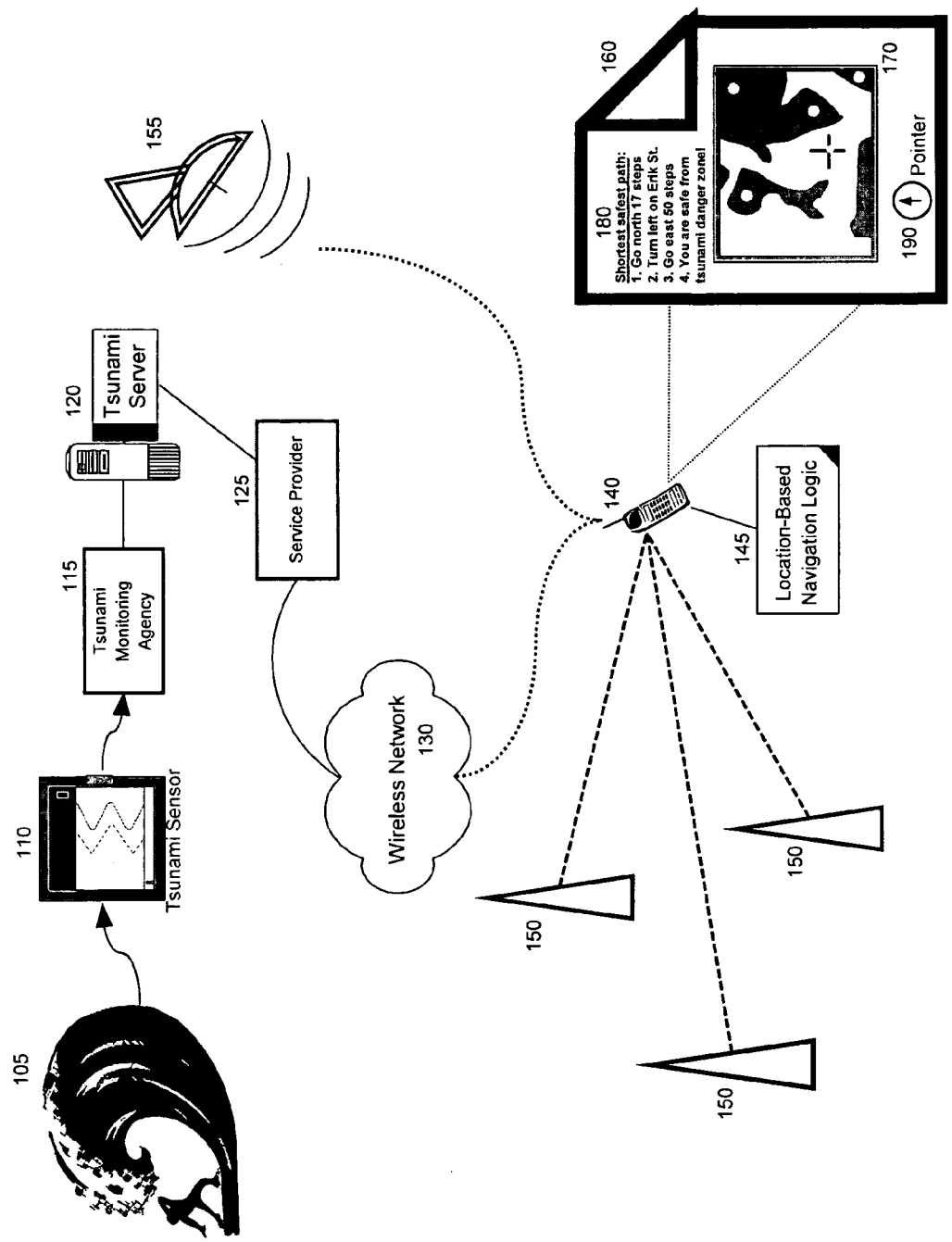
FIG. 1 is a schematic illustration of a location-based navigational tsunami alerting system.

In further illustration FIG. 1 is a schematic illustration of a location-based navigational tsunami alerting system. An oncoming tsunami 105 can be detected by open ocean tsunami sensors 110. Detection by the sensors can involve checking the varying pressure of water as waves pass overhead. Once the tsunami sensors in the ocean 110 are triggered by an oncoming tsunami, the sensors 110 can transmit the ocean data in real-time to a tsunami monitoring agency 115. The monitoring agency 115 can house a tsunami server 120 which can receive data from observations at sea and combine it with other relevant information, such as computer simulation modeling that predicts the intensity and path of the oncoming tsunami.

The tsunami server 120 can additionally calculate and flag multiple sets of geographic coordinates that correspond to zones of danger. A service provider 125 can transmit the information from the tsunami server 120 through a wireless network 130 to any wireless mobile computing device 140 embedded with location-based navigation logic 145. The location of the mobile computing device can be established by either cellular triangulation 150 or by global positioning system (GPS) 155. A subscriber can elect to have a set of navigational instructions 160 displayed that can include a visual map/path 170 corresponding to step-by-step textual instructions 180 along with a current pointer 190 that can point the subscriber in the direction of the shortest safest path to get out of a zone of danger based on the subscriber's current geographic location. The system is adapted to find a closer safety zone if the user changes direction. It should be noted that the navigational instructions 160 which include the map 170, textual instructions 180, and the pointer 190 are dynamically updated in real-time to reflect the most up-to-date navigational instructions directions as the user approaches a point of safety.

Figure 2:
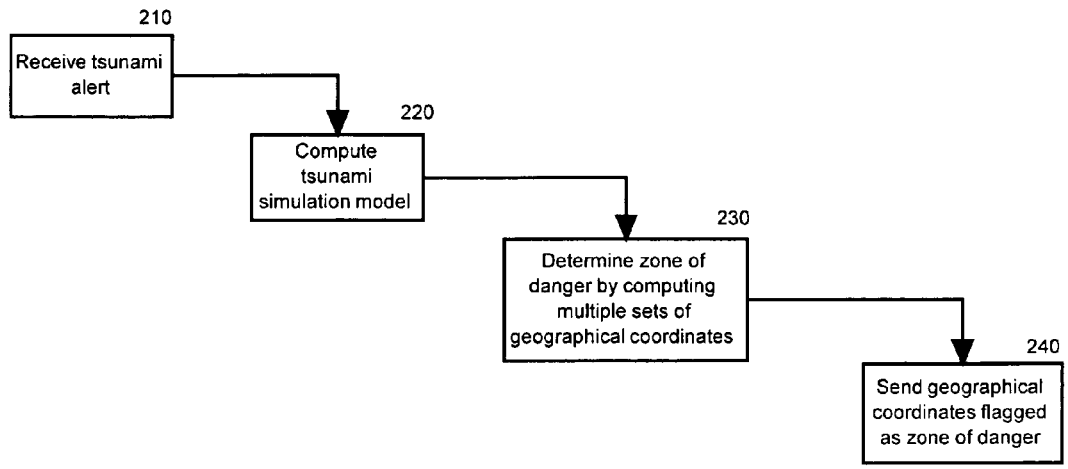
FIG. 2 is a flow chart illustrating a server-end process for a location-based navigational tsunami alerting in the system of FIG. 1.

In further illustration FIG. 2 is a flow chart illustrating a server-end process for a location-based navigational tsunami alerting in the system of FIG. 1. In step 210 a tsunami server can receive a tsunami alert. Next in step 220 the server can compute tsunami simulation computer modeling to predict the intensity and path of the oncoming tsunami. In step 230 the server system can determine one or more zones of danger by computing multiple sets of geographical coordinates. It should be noted that each set of geographical coordinates can define the boundary for a particular geographic zone of danger. Finally in step 240 the server can send multiple sets of geographical coordinates flagged as a danger zone to a mobile computing device through a wireless network.

Figure 3:
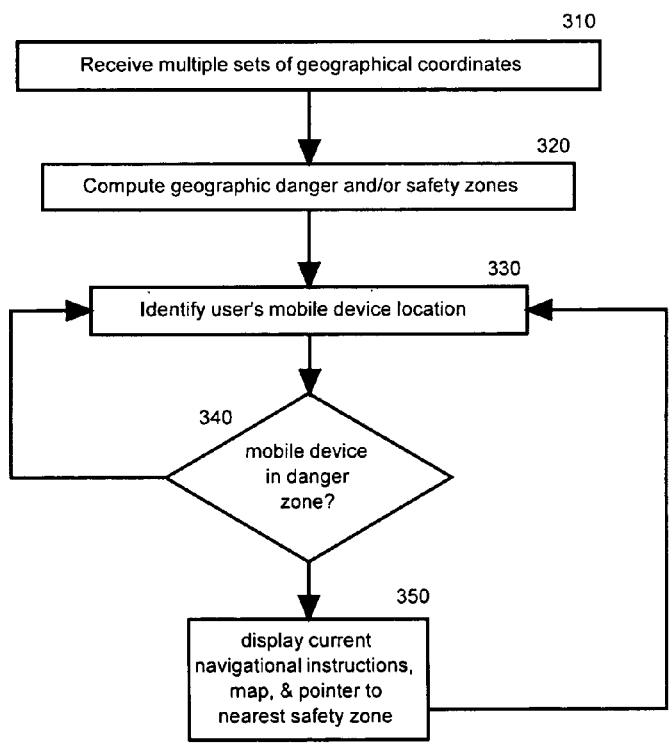
FIG. 3 is a flow chart illustrating a client-end process for location-based navigational tsunami alerting in the system of FIG. 1.

In further illustration FIG. 3 is a flow chart illustrating a client-end process for location-based navigational tsunami alerting in the system of FIG. 1. In step 310 a wireless mobile computing device such as a cell phone, PDA, can receive or compute multiple sets of geographical coordinates flagged as zones of danger. In step 320 geographic danger and/or safety zones can be computed based on geographic coordinates that have been flagged as within the zone of danger. All other coordinates that do not fall within the designated zone of danger, can be included in a safety zone. Next in step 330 the subscriber's geographic location can be determined through either GPS satellite or cellular triangulation which is known in the art.

Next in decision step 340 it can be determined whether the mobile device is in the zone of danger. If not, the logic will keep checking by constantly listening to the mobile device's current location in step 340. If the mobile device subscriber is within a zone of danger, then in step 350 a set of navigational instructions can be displayed in the mobile device that points the subscriber to the safest path to the nearest safety zone geographic coordinate safe from flooding and destruction.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A location-based tsunami alerting method comprising:
   receiving, by a processor of a mobile computing device, one or more sets of geographical coordinates, each set of geographical coordinates corresponding to a zone of danger resulting from a tsunami;
   computing, by the processor of the mobile computing device, a geographic zone of danger based on the one or more sets of geographical coordinates;
   determining, by the processor of the mobile computing device, a current geographic location for the mobile computing device;
   responsive to determining that the mobile computing device's current geographic location being in the computed geographic zone of danger, calculating, by the processor of the mobile computing device, a shortest safest path to direct the mobile computing device out of the computed geographic zone of danger;
   rendering, by the processor of the mobile computing device, in the mobile computing device, a set of personalized navigational instructions from the determined geographic location for the mobile computing device to a geographic location outside of the computed geographic zone of danger,
   wherein the set of personalized navigational instructions includes a visual map and/or path corresponding to step-by-step textual instructions along with a current pointer that points a user of the mobile computing device in a direction of the shortest safest path to get out of the computed geographic zone of danger based on the determined current geographic location of the mobile computing device and
   wherein the current pointer points to a first zone of safety; and,
   responsive to tracking the mobile computing device changing direction away from the first zone of safety, determining, by the processor of the mobile computing device, a second zone of safety that is closer to the mobile computing device's current geographic location.

2. The method of claim 1, further comprising computing, by the processor of the mobile computing device, a first zone of safety based on the one or more sets of geographical coordinates, wherein the first zone of safety comprises a set of geographic coordinates as a boundary area of the first zone of safety.

3. The method of claim 1, wherein rendering the set of personalized navigational instructions further comprises dynamically updating the personalized navigational instructions in real-time.

4. The method of claim 1, further comprising rendering, by the processor of the mobile computing device, updated distance information between the mobile computing device's current geographic location and a destination zone of safety.

5. The method of claim 1, wherein determining, by the processor of the mobile computing device, the current geographic location for the mobile computing device is established by global positioning system (GPS) coordinates.

6. The method of claim 1, wherein determining, by the processor of the mobile computing device, the current geographic location for the mobile computing device is established by cellular triangulation.

7. The method of claim 1, further comprising computing, by the processor of the mobile computing device, a second zone of safety based on the one or more sets of geographical coordinates, wherein the second zone of safety comprises a set of geographic coordinates as a boundary area of the second zone of safety.

8. A data processing system for location-based tsunami alerting navigational instructions in a mobile computing device, the data processing system comprising:
   a central processing unit in the mobile computing device;
   a memory component in the mobile computing device;
   a visual display in the mobile computing device; and,
   location-based navigation logic in the mobile computing device that is enabled to
      receive one or more sets of geographical coordinates, each set of geographical coordinates corresponding to a zone of danger resulting from a tsunami,
      compute a geographic zone of danger based on the one or more sets of geographical coordinates,
      determine a current geographic location for the mobile computing device,
      responsive to determining that the mobile computing device's current geographic location being in the computed geographic zone of danger, calculate a shortest safest path to direct the mobile computing device out of the computed geographic zone of danger,
      render in the mobile computing device a set of personalized navigational instructions from the determined current geographic location for the mobile computing device to a geographic location outside of the computed geographic zone of danger,
      wherein the set of personalized navigational instructions includes a visual map and/or path corresponding to step-by-step textual instructions along with a current pointer that points a user of the mobile computing device in the direction of the shortest safest path to get out of the computed geographic zone of danger based on the current geographic location of the mobile computing device and
      wherein the current pointer points to a first zone of safety, and
      responsive to tracking the mobile computing device changing direction away from the first zone of safety, determine a second zone of safety that is closer to the mobile computing device's current geographic location.

9. The data processing system of claim 8, wherein the location-based navigation logic is further enabled to compute a first zone of safety based on the one or more sets of geographical coordinates, wherein the first zone of safety comprises a set of geographic coordinates as a boundary area of the first zone of safety.

10. The data processing system of claim 8, wherein the location-based navigation logic enabled to render the set of personalized navigational instructions further comprises location-based navigation logic enabled to dynamically update the personalized navigational instructions in real-time.

11. The data processing system of claim 8, wherein the location-based navigation logic is further enabled to render updated distance information between the mobile computing device's current geographic location and a destination zone of safety.

12. The data processing system of claim 8, wherein the location-based navigation logic enabled to determine the current geographic location for the mobile computing device comprises determining the current geographic location for the mobile computing device according to global positioning system (GPS) coordinates.

13. The data processing system of claim 8, wherein the location-based navigation logic enabled to determine the current geographic location for the mobile computing device comprises determining the current geographic location for the mobile computing device according to cellular triangulation.

14. The data processing system of claim 8, wherein the location-based navigation logic is further enabled to compute a second zone of safety based on the one or more sets of geographical coordinates, wherein the second zone of safety comprises a set of geographic coordinates as a boundary area of the second zone of safety.

* * * * *